United States Patent [19]

Evens et al.

[11] Patent Number: 5,096,986
[45] Date of Patent: Mar. 17, 1992

[54] PROCESS FOR PREPARING MODIFIED POLYETHYLENE

[75] Inventors: Georges G. Evens, Maasmechelen, Belgium; Johannes Tijssen, Spaubeek, Netherlands; Luc M. C. Coosemans, Houthalen, Belgium

[73] Assignee: Stamicarbon B.V., Geleen, Netherlands

[21] Appl. No.: 360,308

[22] Filed: Jun. 2, 1989

Related U.S. Application Data

[60] Division of Ser. No. 50,032, May 15, 1987, Pat. No. 4,868,264, which is a continuation of Ser. No. 850,687, Apr. 11, 1986, abandoned.

[30] Foreign Application Priority Data

Oct. 9, 1985 [NL] Netherlands .......................... 8502747

[51] Int. Cl.$^5$ .......................... C08F 2/06; C08F 36/20
[52] U.S. Cl. .................................... 526/151; 526/148; 526/169.2
[58] Field of Search ...................... 526/336, 151, 169.2, 526/148, 124

[56] References Cited

U.S. PATENT DOCUMENTS

| | | | |
|---|---|---|---|
| 3,351,621 | 11/1967 | Bacskai | 526/336 X |
| 3,435,020 | 3/1969 | Olson | 526/336 X |
| 3,651,032 | 3/1972 | Cameli | 526/283 |
| 3,723,399 | 3/1973 | Amiard et al. | 526/281 X |
| 3,819,591 | 6/1974 | Campbell et al. | 526/281 X |
| 3,984,610 | 10/1976 | Elston | 526/336 X |
| 4,028,284 | 6/1977 | Hirai et al. | 260/2.2 C |
| 4,078,131 | 3/1978 | Zarauz | 526/336 |
| 4,125,699 | 11/1978 | Yamamoto | 526/336 |
| 4,189,553 | 2/1980 | Birkelbach | 526/92 |
| 4,366,296 | 12/1982 | Kitagawa | 526/336 |
| 4,404,344 | 9/1983 | Sinn | 526/336 |
| 4,551,503 | 11/1985 | Lal et al. | 526/336 X |
| 4,588,794 | 5/1986 | Oda | 526/282 |

FOREIGN PATENT DOCUMENTS

| | | | |
|---|---|---|---|
| 778691 | 12/1972 | France | 526/281 |
| 1027212 | 4/1966 | United Kingdom | 526/281 |
| 1343226 | 1/1974 | United Kingdom | 526/336 |

OTHER PUBLICATIONS

European Search Report, Application No. 86201745.6.
Dutch Search Report, Application No. NL 8502747.
Patent Abstract of Japan, No. 60-32834 (A), Feb. 20, 1985.
Weissermel et al., Recent Advances in Ziegler Polyolefin Processes; J. Polymer Sci., Symposium No. 51, pp. 187-196 (1975).

Primary Examiner—Fred Teskin
Attorney, Agent, or Firm—Cushman, Darby & Cushman

[57] ABSTRACT

The subject invention relates to a process for preparing a polymer substantially formed from ethylene modified with at least one linear $\alpha,\omega$-diene. In particular, the process involves reacting ethylene with the at least one diene in an inert dispersant. The reaction is carried out in the presence of a magnesium, aluminum, and titanium- and/or vanadium-containing catalyst at a polymerization temperature of at least 135° C. The at least one diene utilized has at least 7 carbon atoms, two non-conjugated double bonds, and is at least 0.001 mole % but less than 0.1 mole % of the total polymer. Furthermore, the at least one diene must be present in an amount small enough such that the activation energy of the viscous flow of the polymer formed is not significantly influenced by the presence of the diene.

4 Claims, No Drawings

PROCESS FOR PREPARING MODIFIED POLYETHYLENE

This is a division of application Ser. No. 07/050,032, filed May 15, 1987, now U.S. Pat. No. 4,868,264, which in turn is a continuation of Ser. No. 06/850,687, filed April 11, 1986, now abandoned.

The invention relates to a polymer substantially formed from ethylene, one or more higher alkenes-1 with 3-18 carbon atoms in an amount of 0 to 15 mole.-% calculated on the ethylene and one or more poly-unsaturated compounds with at least 7 carbon atoms and at least two non-conjugated double bonds polymerizable under the influence of transition metal catalysts. Terpolymers consisting of ethylene, a higher alkene and a diene are described frequently in literature. They usually concern rubber-like polymers, i.e. polymers having a crystallinity lower than 10%; in the present invention there is no question hereof.

Non-rubber-like polymers of ethylene, possibly a higher alkene-1 and diene are known, for instance, from DE-A 30 21 273. The double bonds in the dienes used can, however, noth both of them be polymerized under the influence of transition metal catalysts.

A polymer of ethylene, propylene and ethylidenenorbornene is described in EP-A 0 120 503. The diene, whose double bonds cannot both of them be polymerized under the influence of transition metal catalysts either, is present in an amount of 2.3 mole.-% calculated on the total polymer.

Polymers of ethylene, possibly a higher alkene-1 and a diene whose double bonds are not conjugated and can be polymerized under the influence of transition metal catalysts are described in the German patent application DE-A 22 18 166. The diene is added here in order to influence the processability of the polymer, notably to increase the activation energy of the viscous flow (calculated from the melt flow index ratio of the melt at 150, resp. 190° C.). Therefore, the amount of diene used in the polymer is between 0.33 and 2.7 wt.-% calculated on the total polymer. Such amounts of diene increase the activation energy of the viscous flow of the polymer by crosslinking or branching. As a result, however, the mechanical properties deteriorate.

Copolymers of ethylene and one or more alkenes-1 with 3-18 carbon atoms in an amount of at most 15 mole.-% calculated on the ethylene have been known for some time under the name of LLDPE (linear low-density polyethylene). Such copolymers are generally prepared according to a so-called low-pressure process in the presence of transition metal catalysts and have a density of 940 kg/m³ at most.

Like LDPE, which can be prepared according to a high-pressure process known for long, LLDPE is usually processed to form film. In many respects the mechanical properties of LLDPE film are better than those of LDPE.

In addition to good mechanical properties, films must also have good optical properties, such as a high gloss and a low opacity. Blown films of both LLDPE and HDPE (polyethylene having a density higher than 940 kg/m³) leave much to be desired in this respect.

The object of the invention is a HDPE and/or LLDPE producing better optical properties when processed into blown film than the HDPE and LLDPE known so far without influencing the favourable mechanical properties.

This object is achieved by modifying a polymer substantially formed from ethylene, one or more higher alkenes-1 with 3-18 carbon atoms in an amount of 0-15 mole.-% calculated on the ethylene with such a small amount of one or more poly-unsaturated compounds with at least 7 carbon atoms and at least two non-conjugated double bonds polymerizable under the influence of transition metal catalysts that the activation energy of the viscous flow of the polymer is not significantly influenced by the presence of the poly-unsaturated compound(s).

This small amount to some degree depends on the poly-unsaturated compound(s) applied. If the poly-unsaturated compound(s) has/have a lower molecular weight, the mole percentage required to reach the desired optical effect is generally higher than with higher molecular weights. If the molecular weights are higher, the very small amount of 0.001 mole % may suffice for a distinct optical effect without the mechanical properties of the blown film, for instance puncture resistance and tear resistance, being affected. Generally the presence of at least 0.001 mole.-% and of at most 0.1 mole.-% poly-unsaturated compound(s) is to be recommended, more specifically an amount of between 0.005 and 0.06 mole.-%, and particularly an amount of between 0.005 and 0.03 mole.-%. Surprisingly the HDPE and/or LLDPE thus modified has better optical properties when processed to form blown film than the HDPE and LLDPE known so far and processed into blown film under the same conditions, while the activation energy of the viscous flow of the polymer, according to the now prevailing measuring methods, is not significantly affected.

This is all the more surprising, because it concerns such small amounts of poly-unsaturated compound(s) that, besides the activation energy, other rheological polymer properties, for instance the melt flow index ratio and the viscosity ratio, are not appreciably influenced by the presence of the unsaturated compound(s) either. Herein, also, lies the advantage of the invention. The properties of polymers can be influenced by applying different catalyst systems. Depending on the catalyst, different combinations of properties (for instance flow properties, welding properties, mechanical properties), and so different grades of material can be produced.

By the addition of a small amount of poly-unsaturated compound(s) according to the invention the optical properties can be improved without the other properties being influenced. Hence the best catalyst can always be used, independent of the optical properties. Polymers according to the invention generally have an activation energy <9 kcal/mole, mostly even <8 kcal/mole.

The unsaturated compound(s) must at least contain two double bonds polymerizable under the influence of transition metal catalysts. Hence, suitable are, for instance, 1,6-heptadiene, 1,7-octadiene, 1,8-nonadiene, 1,9-decadiene, but also 1,4,9-decatriene, 1,5,9-decatriene, cyclic endomethylenedienes and the like. It is recommendable for the unsaturated compounds to be dienes, and that linear α,ω-dienes or cyclic endomethylenedienes. When using linear α,ω-dienes, preference should be given to compounds having 8-12 carbon atoms. 1,9-decadiene in particular is a compound producing good results.

The presence of a small amount of poly-unsaturated compound(s) having at least 7 C-atoms and at least two non-conjugated double bonds polymerizable under the influence of transition metal catalysts improves the optical properties of blown films produced from all kind of grades of HDPE and LLDPE, such as LLDPE in which butene is the comonomer and also hexene LLDPE or octene LLDPE. The most favourable combination of properties is obtained with LLDPE modified according to the invention, in which the comonomer has at least 4 and at most 10 carbon atoms.

The invention also relates to a process for preparing modified polyethylene in which process ethylene, one or more alkenes-1 with 3–18 carbon atoms in an amount of 0 to 50 mole.-% calculated on the ethylene and such a small amount of (a) poly-unsaturated compound(s) having at least 7 C-atoms and at least two non-conjugated double bonds polymerizable under the influence of transition metal catalyst are reacted with each other in an inert dispersant in the presence of a transition metal catalyst that the activation energy of the viscous flow of the polymer formed is not influenced significantly by the presence of the poly-unsaturated compound(s). This amount depends on the reactivity of the compound in question, notably on the degree to which it allows itself to be incorporated into the polymer under the influence of the catalyst in question. The person skilled in the art and acquainted with the degree of reactivity of various monomers in respect of different catalysts will be able to determine with ease what amount of poly-unsaturated compound(s) is required to reach an optimum optical effect. The amount of unsaturated compound(s) present in the reaction vessel will generally not be larger than 0.3 mole.-% calculated on the total number of monomers, preferably not larger than 0.09 mole % and more specifically not larger than 0.06 mole.-%. For the preparation of a polymer producing the desired high degree it is to be recommended that the polymerization be carried out in the presence of a titanium- and/or vanadium-containing catalyst system with (a) linear, $\alpha,\omega$-unsaturated compound(s) and/or cyclic endomethylenediene(s). The polymerization in the presence of 1,9-decadiene produces good results.

The polymerization can be effected in a manner known per se in the presence of a transition metal catalyst, preferably in a so-called suspension system or solution system in which the inert dispersant is present in a liquid form. Particularly suitable is a system in which the polymerization temperature is so high that it can be referred to as solution polymerization, viz. higher than 135° C.

The usual additives, such as stabilizers, lubricants, anti-blocking agents and the like can be added in the usual way.

The invention also relates to articles, particularly to films, produces from modified LLDPE or HDPE.

The invention will now be elucidated by means of examples without, however, being limited thereto.

POLYMERIZATION

To a 2-liter continuous polymerization reactor 12.3 liters petrol (boiling point fraction 66°–74° C.) is fed.

Ethylene (1.98 kg/hr) dissolved in petrol, octene (1.1 kg/hr) and a third compound according to the table are fed to the reactor, which is operated at a temperature of 185° C. and a pressure of 50 bar.

Solutions of the catalyst ingredients are prepared in petrol: SEAC: 50 mmoles/l, EBM: 10 mmoles/l, TBT: 4 mmoles/l and IpCl: 10 mmoles/l. The catalyst flow thus mixed is then fed to the reactor. The residence time in the reactor is about 5 minutes.

SEAC: sesquiethylaluminiumchloride
EBM: ethylbutylmagnesium
TBT: tetrabutoxytitanium
IpCl: isopropylchloride.

FILM PREPARATION

Blown film having a thickness of 50 μm is produced by means of a Collin extruder with three-zone screw, screw diameter 20 mm, and a length: diameter ratio of 20 with a yield of 1.2 kg/hr. The slit diameter is 20 mm, the slit width 2 mm. The temperature of the melt is 190° C., the blow-up ratio is 3, the frost line height is 8 cm.

Measuring methods

The activation energy of the viscous flow of the polymer was defined as in DE-A 2 218 160:

$$E_A = 22.4 \log \frac{MFI\,190}{MFI\,150},$$

where MFI equals the melt flow index according to ASTM D 1238, cond. E, at respectively 190° and 150° C.

The density (d) according to ASTM D 1505.
The melt flow index (MFI) according to ASTM D 1238, cond. E.
The melt flow index at high load (HLMFI) according to ASTM D 1238, cond. F.
The melt flow index ratio $$MFR = \frac{HLMFI}{MFI}$$

The gloss (45°) according to ASTM D 2457.
The opacity according to ASTM D 1003.
The intrinsic viscosity ($[\eta]_{dec.}^{135}$) has been determined in decalin at 135° C.
The viscosity ratio (VR) is the ratio of the intrinsic viscosities of polymers with the same MFI prepared without, respectively with one or more poly-unsaturated compounds.

TABLE

| | | | Polymer | | | | | | | | | optical properties of the film | |
|---|---|---|---|---|---|---|---|---|---|---|---|---|---|
| Exp. No. | Third monomer grade | g/hr | incorporation* mole.-% | d kg/m³ | MFI dg/min. | HLMFI dg/min. | MFR | Ea kcal/ mole | $[\eta]$ | 135 dec dl/g | VR | gloss % | opacity % |
| comp. 1 | — | 0 | 0 | 916 | 1.10 | 39.4 | 35.8 | 7.7 | 1.90 | | 1.0 | 22 | 25 |
| comp. 2 | hexadiene | 3.4 | 0.022 | 915 | 1.91 | 69.3 | 36.3 | 8.3 | — | | — | 24 | 27 |
| comp. 3 | " | 5.7 | 0.037 | 916 | 1.88 | 68.7 | 36.5 | 8.0 | — | | — | 25 | 24 |
| comp. 3 | " | 11.3 | 0.074 | 917 | 1.95 | 71.8 | 36.8 | 7.6 | — | | — | 26 | 26 |
| comp. 5 | " | 18.1 | 0.118 | 916 | 1.63 | 54.7 | 33.6 | 8.0 | — | | — | 26 | 24 |
| comp. 6 | " | 24.9 | 0.163 | 916 | 1.57 | 52.8 | 33.6 | 7.6 | 1.76 | | 1.0 | 26 | 26 |
| I | octadiene | 4.6 | 0.019 | 915 | 1.19 | 42.6 | 35.8 | 7.9 | — | | — | 27 | 21 |

TABLE-continued

| Exp. No. | Third monomer grade | g/hr | Polymer incorporation* mole.-% | d kg/m³ | MFI dg/min. | HLMFI dg/min. | MFR | Ea kcal/mole | [η] 135 dec dl/g | VR | optical properties of the film gloss % | opacity % |
|---|---|---|---|---|---|---|---|---|---|---|---|---|
| II | " | 8.0 | 0.033 | 915 | 1.42 | 51.6 | 36.3 | 7.8 | — | — | 32 | 18 |
| III | " | 12.1 | 0.052 | 918 | 1.63 | 58.9 | 36.1 | 7.8 | 1.73 | 1.0 | 41 | 15 |
| comp. 7 | decene | 5.8 | 0.012 | 915 | 1.92 | 65.6 | 34.2 | 7.9 | — | — | 27 | 24 |
| comp. 8 | " | 9.7 | 0.020 | 914 | 1.85 | 68.1 | 36.8 | 7.9 | — | — | 25 | 24 |
| comp. 9 | " | 19.3 | 0.040 | 914 | 1.36 | 48.0 | 35.3 | 7.6 | 1.83 | 1.0 | 25 | 25 |
| IV | decatriene | 5.6 | 0.018 | 915 | 1.77 | 61.4 | 34.7 | 8.0 | — | — | 26 | 23 |
| V | " | 9.4 | 0.029 | 916 | 1.60 | 57.1 | 35.7 | 8.5 | — | — | 28 | 23 |
| VI | " | 18.8 | 0.059 | 917 | 1.90 | 65.6 | 34.5 | 8.2 | 1.67 | 1.0 | 31 | 22 |
| VII | decadiene | 1.0 | 0.003 | 913 | 1.50 | 54.1 | 36.1 | 8.0 | — | — | 24 | 22 |
| VIII | " | 1.9 | 0.006 | 914 | 1.10 | 39.6 | 36.0 | 7.7 | — | — | 29 | 20 |
| IX | " | 3.9 | 0.012 | 914 | 1.20 | 45.0 | 37.5 | 8.0 | 1.86 | 1.0 | 34 | 17 |

*calculated from reactivity data

We claim:

1. A process for preparing a polymer substantially formed from ethylene modified with at least one linear α,ω-diene having at least 7 carbon atoms and having at least two non-conjugated double-bonds, which are both polymerizable under the influence of transition metal catalysts, wherein the amount of said at least one diene is at least 0.001 mole % of the total polymer but less than about 0.1 mole % of the total polymer whereby the activation energy of the viscous flow of the polymer is not significantly influenced by the presence of said at least one diene, comprising the following steps:

reacting ethylene and at least one said diene having at least 7 carbon atoms and at least two non-conjugated double bonds polymerizable under the influence of transition metal catalysts with each other in an inert dispersant, in the presence of a magnesium, aluminum, and titanium- and/or vanadium-containing catalyst at a polymerization temperature of at least 135° C. wherein the amount of said diene present is so small that the activation energy of the viscous flow of the polymer formed is not significantly influenced by the presence of the at least one diene.

2. Process according to claim 1, wherein the amount of diene compound present is not larger than 0.3 mole.-% calculated on the total amount of monomers.

3. Process according to claim 2, wherein the amount of said diene present is not larger than 0.09 mole.-% calculated on the total amount of monomers.

4. Process according to claim 3, wherein the amount of diene compound present is not larger than 0.06 mole.-% calculated on the total amount of monomers.

* * * * *

UNITED STATES PATENT AND TRADEMARK OFFICE
CERTIFICATE OF CORRECTION

PATENT NO. : 5,096,986

DATED : MARCH 17, 1992

INVENTOR(S) : GEORGES G. EVENS, JOHANNES TIJSSEN, LUC M. C. COOSEMANS

It is certified that error appears in the above-identified patent and that said Letters Patent is hereby corrected as shown below:

Col. 1, line 24, change "noth" to --not--

Col. 2, line 62, change "and that" to --especially--

Col. 3, line 33, change "mononomers" to --monomers--

Col. 3, line 36, after "desired", insert --effects to a--

Col. 3, line 54, change "produces" to --produced--

Signed and Sealed this

Fifth Day of October, 1993

Attest:

BRUCE LEHMAN

Attesting Officer

Commissioner of Patents and Trademarks